(12) United States Patent
Erell

(10) Patent No.: US 6,591,237 B2
(45) Date of Patent: *Jul. 8, 2003

(54) KEYWORD RECOGNITION SYSTEM AND METHOD

(75) Inventor: Adoram Erell, Herzlia (IL)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/459,346

(22) Filed: Dec. 13, 1999

(65) Prior Publication Data

US 2001/0012997 A1 Aug. 9, 2001

Related U.S. Application Data

(63) Continuation of application No. 08/763,999, filed on Dec. 12, 1996, now Pat. No. 6,023,676.

(51) Int. Cl.[7] .............................................. G10L 15/00
(52) U.S. Cl. ...................... 704/251; 704/241; 704/246; 704/256
(58) Field of Search ................................ 704/241, 246, 704/251, 256, 271, 272

(56) References Cited

U.S. PATENT DOCUMENTS

| | | | | |
|---|---|---|---|---|
| 4,802,231 A | * | 1/1989 | Davis | 382/219 |
| 4,896,358 A | * | 1/1990 | Bahler et al. | 704/257 |
| 5,218,668 A | * | 6/1993 | Higgins et al. | 704/200 |
| 5,509,104 A | * | 4/1996 | Lee et al. | 704/256 |
| 5,649,057 A | * | 7/1997 | Lee et al. | 704/256 |
| 5,675,706 A | * | 10/1997 | Lee et al. | 704/256 |
| 5,717,826 A | * | 2/1998 | Setlur et al. | 704/252 |
| 5,758,319 A | * | 5/1998 | Knittle | 704/251 |
| 5,774,859 A | * | 6/1998 | Houser et al. | 704/275 |
| 5,797,123 A | * | 8/1998 | Chou et al. | 704/256 |
| 5,832,430 A | * | 11/1998 | Lleida et al. | 704/256 |
| 5,937,383 A | * | 8/1999 | Ittycheriah et al. | 704/255 |
| 5,983,186 A | * | 11/1999 | Miyazawa et al. | 704/275 |

* cited by examiner

*Primary Examiner*—David Abebe
(74) *Attorney, Agent, or Firm*—Eitan, Pearl, Latzer & Cohen Zedek, LLP.

(57) ABSTRACT

A keyword recognition system for speaker dependent, dynamic time warping (DTW) recognition systems uses all of the trained word templates in the system, (keyword and vocabulary), to determine if an utterance is a keyword utterance or not. The utterance is selected as the keyword if a keyword score indicates a significant match to the keyword template and if the keyword score indicates a better match than do the entirety of scores to the vocabulary word templates.

20 Claims, 5 Drawing Sheets

KEYWORD RECOGNITION SYSTEM AND METHOD

CROSS-REFERENCE TO RELATED APPLICATIONS

This application is a continuation of allowed U.S. patent application Ser. No. 08/763,999 filed Dec. 12, 1996 now U.S. Pat. No. 6,023,676, which is incorporated herein by reference.

FIELD OF THE INVENTION

The present invention relates to speech recognition systems generally and to those which are activated by a keyword in particular.

BACKGROUND OF THE INVENTION

Speech recognition of isolated words is used for voice-activated command and control applications. There are usually two modes of activating the recognition system, an "open microphone mode" and a "button activated" or "push-to-talk" mode. In the open microphone mode, the recognizer continuously searches for a match between the acoustic input and the vocabulary of commands which form part of the recognizer. In the button activated mode, the recognizer searches for a match only after the user pushes a button indicating that a command is expected within the next few seconds.

Many speech recognition applications have selected the button activated mode because speech recognition systems perform better on its task: "Given the utterance, which is the most likely word, out of my N known words, that was said?". It is far harder for speech recognition systems to perform the open microphone task of "Does this utterance correspond to one of my N known words?" The reason for this difference is related to the variability in the environment and in the manner of speaking compared to the originally trained (or "known") words.

In each case, recognition scores indicating how close the utterance is to each of the known words are determined. The "open" vocabulary of the open microphone compares the recognition scores to an absolute threshold and is therefore, affected by significant "noises". The "closed" vocabulary of the button activated mode, however, attempts to determine which word was said and thus, compares the recognition scores to each other, selecting the best relative score. Since the noise generally affects all of the scores in the same way, the scores generally rise and fall together and the resultant comparison is not affected by this variability.

Unfortunately, the button activated mode is not fully hands-free since the user has to push a button prior to saying the command.

A known method for improving the acceptance/rejection decision in the open microphone mode is to use background or filler templates which model background or non-relevant speech. The background or filler templates are typically produced from a large database of speech utterances which are not part of the particular vocabulary of the recognizer.

Such a method is described in the article "Word Spotting From Continuous Speech Utterances" by R. C. Rose, *Automatic Speech and Speaker Recognition—Advanced Topics*, edited by C. H. Lee, F. K. Soong and K. K. Paliwal, Kluwer Academic Publishers, 1996, pp. 303–329. This method is relevant to Hidden Markov Model (HMM) type, speaker independent recognition systems which are described in "A Tutorial on Hidden Markov Models and Selected Applications in Speech Recognition" by L. R. Rabiner, *Proceedings of the IEEE,* Vol. 7, No. 2, February 1989, pp. 257–286. Both articles are incorporated herein by reference.

In the open microphone mode, the standard measure for the rejection/acceptance capability of a recognition system is the rate of false alarms per vocabulary word, for a given rate of detection. In other words, for a given rate of true recognition of a vocabulary word, how many times did the system claim a vocabulary word was said when it had not been said. Unfortunately, the more words in the vocabulary, the more false alarms there are and the more of a nuisance the system is to the user. Designers have thus tried to reduce the number of vocabulary words in the open microphone mode.

One method to do so without limiting the functionality of the recognition system is to separate the recognition operation into two steps. This method is described in section 6.2 of the article by R. C. Rose and involves using a single or a few keywords, which are recognized in open microphone mode, as an activation element. Once the uttered keyword has been recognized, the method operates in the closed vocabulary mode, selecting the next utterance as one of the words in the closed vocabulary. In effect, the keywords of this method replace the button of the button activation mode described hereinabove.

The above-described two step method provides hands-free operation, as in the open microphone mode, but the number of false alarms is reduced since the vocabulary in the open microphone mode is reduced. Such a mode of operation is natural for menu-type operations where the user activates one of a few functions with a keyword and only afterwards says one of the commands which are relevant to the function.

SUMMARY OF THE PRESENT INVENTION

The present invention utilizes two types of templates, that of a keyword (called herein a "keyword template") and those of a closed vocabulary (called herein "vocabulary templates").

It is an object of the present invention to provide a keyword recognition system for speaker dependent, dynamic time warping (DTW) recognition systems. The present invention uses all of the trained templates in the system (keyword and vocabulary) to determine if an utterance is a keyword utterance or not.

Initially, only the keyword template is utilized as a first acceptance criterion. If that criterion is passed, then the utterance is compared to all of the vocabulary templates and their match scores recorded. Only if the match to the keyword is higher than all of the matches to the vocabulary templates, is the utterance accepted as a keyword utterance. At that point, a listening window is opened and the following utterance is compared to each of the utterances of the closed vocabulary. Thus, the present invention utilizes the vocabulary templates as filler templates.

There is therefore provided, in accordance with a preferred embodiment of the present invention, a system and method for recognizing an utterance as a keyword. The system activates a speaker dependent recognition system on a plurality of vocabulary words and includes a pattern matcher and a criterion determiner. The pattern matcher initially matches the utterance to a keyword template and produces a corresponding keyword score indicating the quality of the match between the utterance and the keyword template. The pattern matcher also matches the utterance to a plurality of vocabulary templates, the result being a corresponding plurality of vocabulary scores each indicating the quality of the match between the utterance and one of the vocabulary templates. The criterion determiner selects the utterance as the keyword if the keyword score indicates a significant match to the keyword template and if the keyword score indicates a better match than do the entirety of the vocabulary scores. Once the utterance is accepted as the keyword, the criterion determiner activates the speaker dependent recognition system to match at least a second utterance to the words of the closed vocabulary.

Moreover, in accordance with a preferred embodiment of the present invention, the pattern matcher performs dynamic time warping between the utterance and the relevant one of the templates.

Additionally, in accordance with a preferred embodiment of the present invention, the criterion determiner opens a listening window once the utterance is accepted as the keyword thereby to recognize the words of the closed vocabulary. The pattern matcher then matches at least the second utterance to the vocabulary templates thereby to determine which word of the closed vocabulary was spoken in the second utterance.

Further, in accordance with a preferred embodiment of the present invention, the present invention also includes a preprocessing operation which selects suitable vocabulary templates for use in the keyword recognition. The suitable vocabulary templates are those which are different, by a predetermined criterion, from the keyword template.

Still further, in accordance with a further preferred embodiment of the present invention, there can be more than one keyword template where each is associated with its own vocabulary. The present invention determines which keyword is spoken and accepts the utterance only if the keyword score is large enough and better than the score of the utterance to at least a portion of all of the vocabulary words. The present invention then activates the recognition system on the vocabulary associated with the detected keyword.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
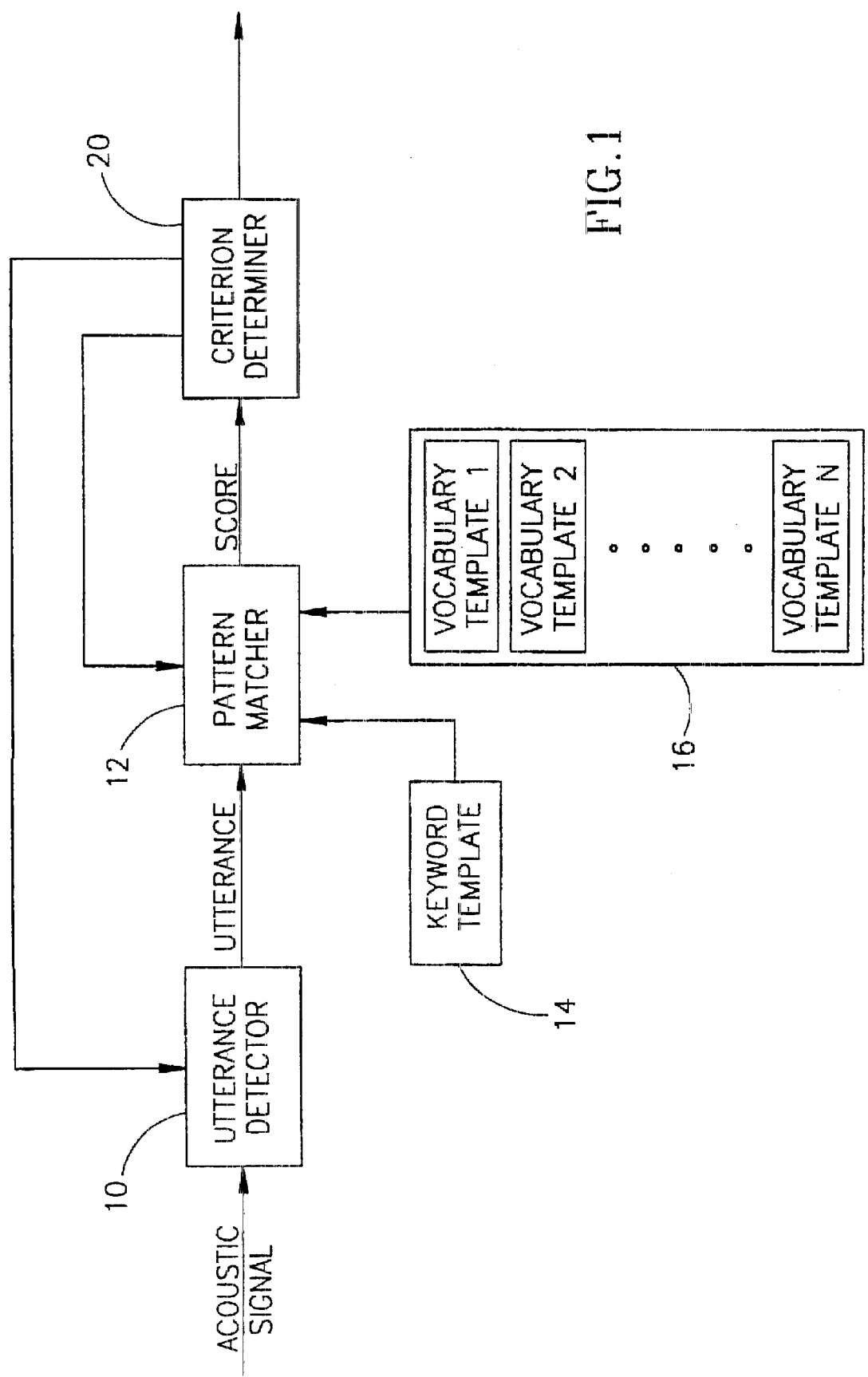
FIG. 1 is a block diagram illustration of a keyword recognition system, constructed and operative in accordance with a preferred embodiment of the present invention.
Figure 2:
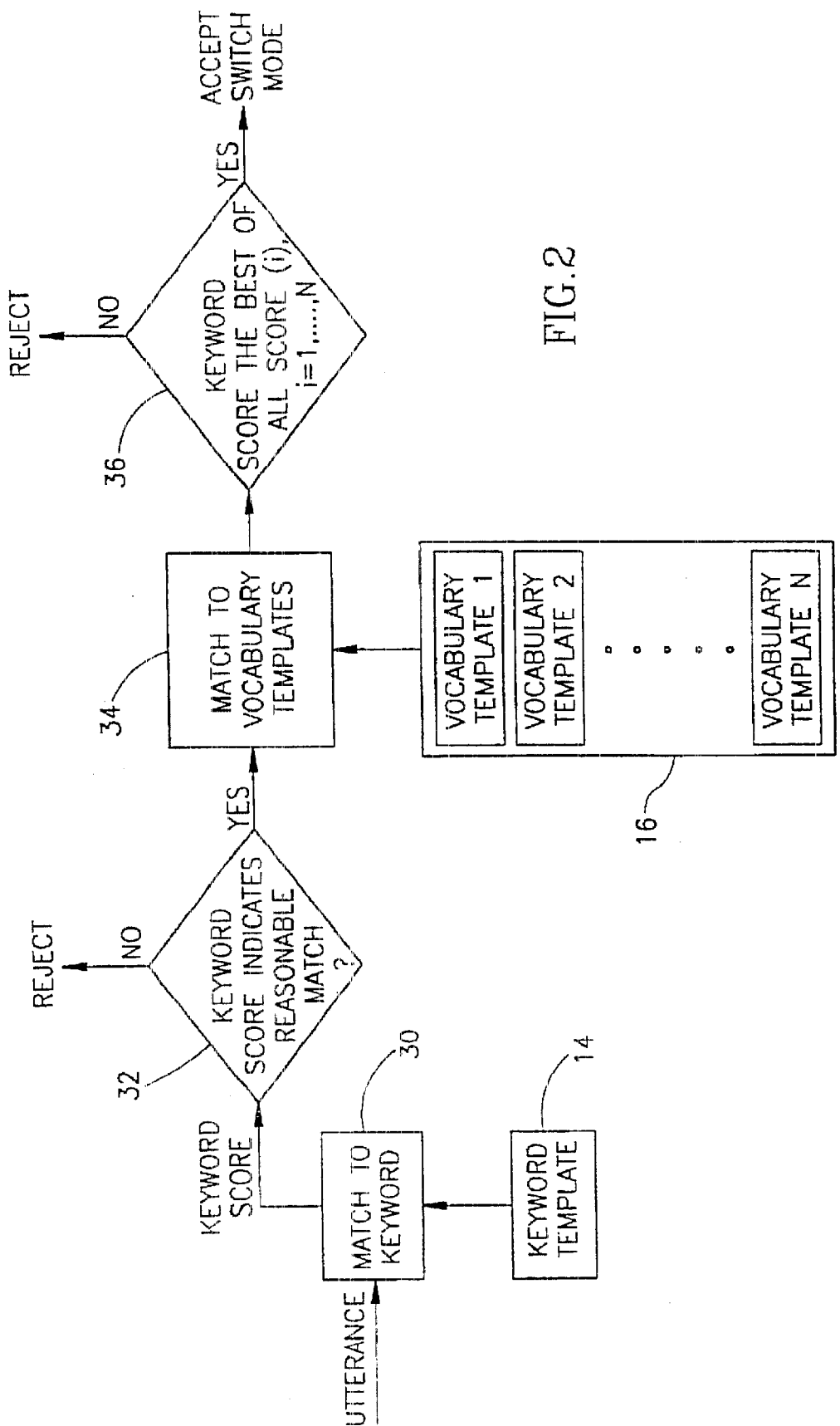
FIG. 2 is a flow chart illustration of a method of recognizing a keyword from among a continuous stream of utterances, operative in accordance with a preferred embodiment of the present invention and in conjunction with the system of FIG. 1.
Figure 3:
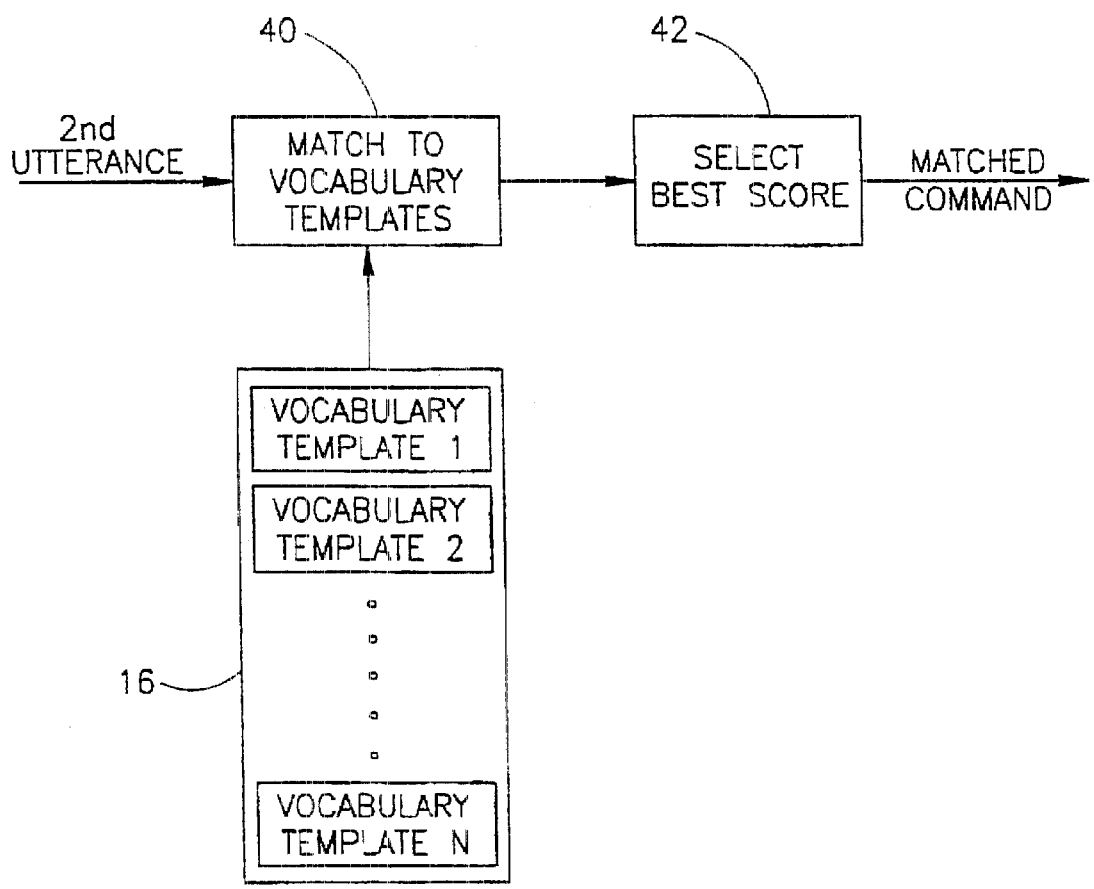
FIG. 3 is a flow chart illustration of a method of recognizing a vocabulary word once the method of FIG. 2 has recognized a keyword.

Reference is now made to FIGS. 1, 2 and 3 which respectively illustrate a keyword recognition system (FIG. 1) and the methods with which to operate it (FIGS. 2 and 3). The keyword recognition system comprises an utterance detector 10, a pattern matcher 12 having associated with it a keyword template 14 and a database 16 of templates for words of a closed vocabulary, and a criterion determiner 20. The words of the closed vocabulary are typically words which it is desired to be able to recognize once the keyword has been said. It will be appreciated that the templates for both the keyword and the words of the closed vocabulary are trained by the user prior to operation of this system.

The utterance detector 10 receives an input acoustic signal and determines whether or not there was a speech utterance therein, providing an output only when there was, in fact, an utterance. Detector 10 can be any suitable utterance detector such as a voice/no voice (VOX) detector which detects words spoken in isolation or a word-spotting method capable of detecting a keyword uttered within a longer utterance of continuous speech, such as the word-spotting methods described in the article by R. C. Rose provided hereinabove. An exemplary VOX is described in Part 6 of the European Telecommunication Standard ETS 300 581-6, entitled "part 6: Voice Activity Detector (VAD) for Half Rate Speech Traffic Channels (GSM 06.42)" which is incorporated herein by reference.

The pattern matcher 12 can be any suitable pattern matcher such as those performing dynamic time warping (DTW) or any other suitable speaker dependent pattern matcher. DTW is described in U.S. Pat. No. 4,488,243 to Brown et al. and is incorporated herein by reference.

In accordance with a preferred embodiment of the present invention, the pattern matcher 12 produces match scores of the input utterance against either the keyword template 14 or the database 16 of templates for the words of the closed vocabulary.

The criterion determiner 20 and pattern matcher 12 operate together in two modes; a keyword determining mode (FIG. 2) and a vocabulary word determining mode (FIG. 3). In the first mode and as shown in FIG. 2, pattern matcher 12 first matches the utterance (step 30) to the keyword template and produces a keyword score, where, in this embodiment, the lower the score (i.e. the lower the error between the utterance and the template), the better the match. Other criteria of being "best" can also be utilized herein and the tests of steps 32 and 36 should be changed accordingly. If desired, the pattern matcher 12 can normalize the keyword score by some function, such as an average of all of the other scores, in order to reduce its environmental variability.

In step 32 the criterion determiner 20 determines if the keyword score indicates that the utterance is significantly far, in absolute terms, from the keyword score. For example, in this embodiment, the keyword score is too large. If so, the utterance is ignored and the system waits until utterance detector 10 detects a further utterance.

Otherwise and in accordance with a preferred embodiment of the present invention, the pattern matcher 12 matches the utterance (step 34) to the entirety of vocabulary templates in database 16, producing a score, indicated as score(i), for each word of the closed vocabulary. Criterion determiner 20 accepts the utterance as the keyword only if the keyword score is "better" than all of the scores, score(i), i=1 . . . N, of the vocabulary words, where, in this embodiment, "better" means "is less than". In other words, the keyword template has not only to be a reasonable match in absolute terms, but has to match the keyword template better than any of the vocabulary templates in database 16. The first criterion (of step 32) is an absolute criterion and the second criterion (of step 36) is a relative one.

It will be appreciated that, if an utterance is not a keyword, it has an equal chance of being classified as one of the vocabulary comprised of the keyword and the words of the closed vocabulary. Thus, the vocabulary templates serve to reduce the chance that a non-keyword utterance will be classified as a keyword, thereby increasing the quality of the keyword recognition.

Once criterion determiner 20 accepts the utterance as a keyword utterance (i.e. the result of step 36 is positive), the system switches modes to the vocabulary word determining mode and proceeds to the method of FIG. 3 in which it opens a listening window for utterances which will match the vocabulary words in database 16.

In step 40, the pattern matcher 12 receives an utterance from utterance detector 10 and matches the utterance to each of the vocabulary templates in database 16, producing a score, score(i), for each one. In step 42, criterion determiner 20 selects the best score from among score(i) in accordance with any suitable criterion, such as smallest. The criterion determiner 20 provides the word associated with the selected score as the matched word.

It will be appreciated that the keyword recognition system of the present invention provides a hands-free operation with a closed vocabulary.

Figure 4:
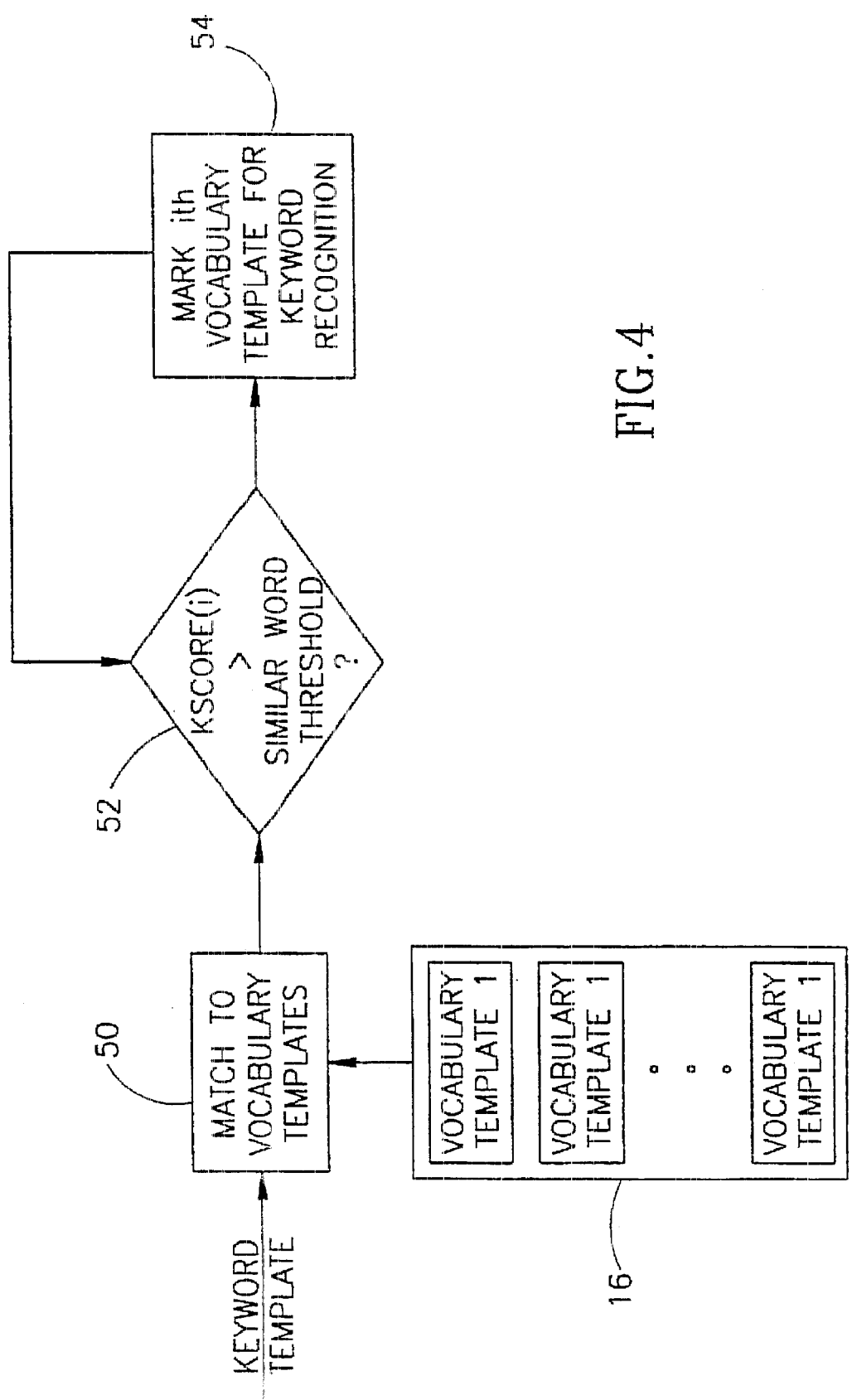
FIG. 4 is a flow chart illustration of a method of selecting which vocabulary words to use.

Reference is now made to FIG. 4 which illustrates a method of processing the vocabulary words to select only those which are not similar to the keyword. The method of FIG. 4 reduces the possibility that a true keyword will not be detected due to being mistaken for a similar sounding vocabulary word.

In step 50, the pattern matcher 12 matches the keyword template to each of the vocabulary templates producing a kscore(i) for each vocabulary template, wherein each kscore(i) indicates the closeness of the keyword and the ith vocabulary word. In step 52, each kscore(i) is compared to a similar word threshold above which the keyword is different than the ith vocabulary word and below which the keyword is too close to the ith vocabulary word.

In step 54 (kscore(i) above threshold), the ith vocabulary template is marked different. Thus, the keyword recognition process of FIG. 2 will utilize the ith vocabulary template (in step 34 thereof). If kscore(i) is below the threshold, the keyword recognition process will not utilize the ith vocabulary template.

Figure 5:
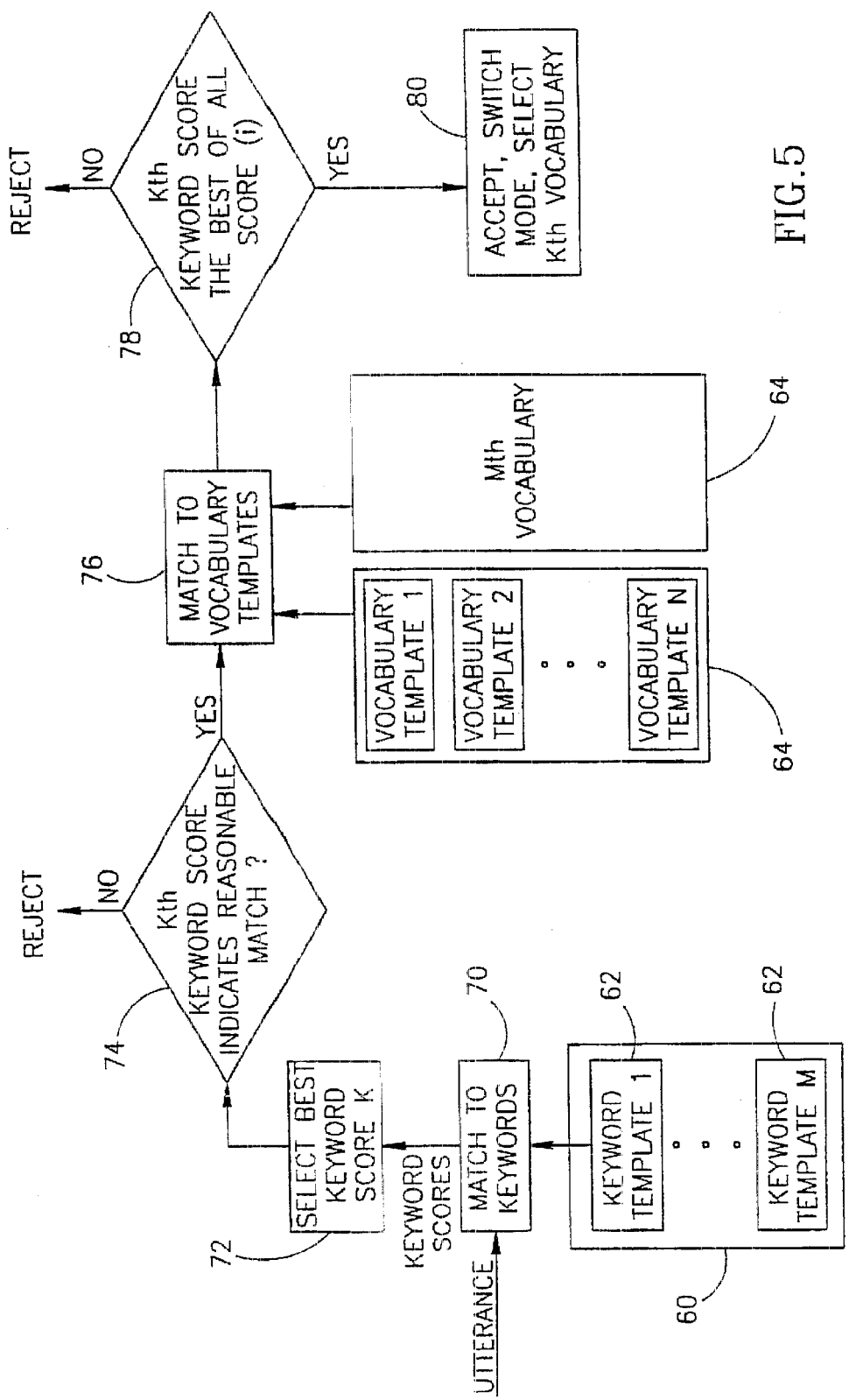
FIG. 5 is a flow chart illustration of a multiple keyword recognition method.

It will be appreciated that a system with might have a plurality of vocabularies, each selected via a different keywords. As illustrated in FIG. 5 to which reference is now made, for this embodiment, the present invention includes a keyword database 60 having a plurality M of keyword templates 62 and a plurality M of vocabulary databases 64.

Initially, the pattern matcher 12 matches (step 70) the utterance with each of the keyword templates 62 of keyword database 60. In step 72, the criterion determiner 20 selects the best keyword score, for example, the keyword score corresponding to the kth keyword template 62.

In step 74, the criterion determiner 20 determines if the kth keyword score indicates that the utterance is significantly far, in absolute terms, from the keyword score. If so, the utterance is ignored and the system waits until utterance detector 10 detects a further utterance.

Otherwise, the pattern matcher 12 matches the utterance (step 76) to the vocabulary templates in all of the vocabulary databases 64. The pattern matcher 12 can match the utterance to all of the vocabulary templates or, as described hereinabove with respect to FIG. 4, to those vocabulary templates not similar to the keyword templates.

Criterion determiner 20 accepts the utterance as the kth keyword only if (step 78) the kth keyword score is better than all of the resultant scores, score(i) of the vocabulary words. In step 80, criterion determiner 20 indicates to pattern matcher to switch modes to the closed vocabulary recognition mode and to operate on the kth vocabulary database.

It will be appreciated by persons skilled in the art that the present invention is not limited to what has been particularly shown and described hereinabove. Rather the scope of the present invention is defined only by the claims which follow:

What is claimed is:

1. A method comprising:
   matching an input utterance to a keyword template having an associated function to generate a keyword score; and
   only if said keyword score satisfies a predetermined criterion, which indicates a reasonable match:
   matching said utterance to a plurality of vocabulary templates associated with said function to generate corresponding vocabulary scores; and
   selecting said utterance as a keyword if said keyword score indicates a better match than said vocabulary scores.

2. The method of claim 1, further comprising activating a speaker dependent speech recognition system when said utterance is selected as said keyword.

3. The method of claim 2, wherein said activating comprises opening a listening window once said utterance is accepted as said keyword.

4. The method of claim 3, wherein said activating further comprises matching at least a second utterance to said vocabulary templates to determine which word of a plurality vocabulary words was spoken in said second utterance.

5. The method of claim 1 further comprising, prior to said matching, selecting said vocabulary templates from among a plurality of possible vocabulary templates, wherein said selected vocabulary templates are those which are different, by a predetermined criterion, from said keyword template.

6. A system comprising:
   a single pattern matcher to match an input utterance to a keyword template having an associated function to generate a keyword score and only if said keyword score satisfies a predetermined criterion, which indicates a reasonable match, to match said utterance to a plurality of vocabulary templates associated with said function to generate corresponding vocabulary scores; and
   a criterion determiner to select said utterance as a keyword if said keyword score indicates a heifer match than said vocabulary scores.

7. The system of claim 6, wherein said criterion determiner is further adapted to activate a speaker dependent speech recognition system when said utterance is selected as said keyword.

8. The system of claim 6, wherein said criterion determiner includes an opening unit adapted to open a listening window once said utterance is accepted as said keyword.

9. The system of claim 6, wherein said pattern matcher further includes a matching unit adapted to match at least a second utterance to said vocabulary templates to determine which word of a plurality of vocabulary words was spoken in said second utterance.

10. The system of claim 6 further comprising a selector adapted to select said vocabulary templates from among a plurality of possible vocabulary templates, wherein said selected vocabulary templates are those which are different, by a predetermined criterion, from said keyword template.

11. A method comprising:

matching an input utterance to at least two keyword templates, each keyword template having an associated function, to generate corresponding keyword scores; and only if a best of said keyword scores satisfies a predetermined criterion, which indicates a reasonable match:

matching said utterance to a plurality of vocabulary templates associated with said functions to generate corresponding vocabulary scores, wherein said plurality of vocabulary templates are divided into subsets and each subset is associated with a different one of said at least two keyword templates; and selecting said utterance as a keyword if the best of said keyword scores indicates a better match than said vocabulary scores.

12. The method according to claim 11 further comprising activating a speaker dependent speech recognition system when said utterance is selected as a subset of said vocabulary words corresponding to said kth keyword.

13. The method of claim 11, wherein said activating comprises opening a listening window once said utterance is accepted as said kth keyword.

14. The method of claim 13, wherein said activating further comprises matching at least a second utterance to said vocabulary templates of said corresponding subset to determine which word of a plurality of vocabulary words was spoken in said second.

15. The method of claim 11 further comprising, prior to said matching, selecting said vocabulary templates from among a plurality of possible vocabulary templates, wherein said selected vocabulary templates are those which are different, by a predetermined criterion, from said keyword templates.

16. A system comprising:

a single pattern matcher to match an input utterance to at least two keyword templates to generate corresponding keyword scores, each keyword template having an associated function, and only if a best of said keyword scores satisfies a predetermined criterion, which indicates a reasonable match, to match said utterance to a plurality of vocabulary templates associated with said functions to generate corresponding vocabulary scores; and a criterion determiner to select said utterance as a kth keyword if the kth one of said at least two keyword scores indicates a better match than said vocabulary scores.

17. The system of claim 16, wherein said criterion determiner is further adapted to activate a speaker dependent speech recognition system when said utterance is selected as a subset of said vocabulary words corresponding to said kth keyword.

18. The system of claim 16, wherein said criterion determiner includes an opening unit adapted to open a listening window once said utterance is accepted as said kth keyword.

19. The system of claim 16, wherein said pattern matcher further includes a matching unit adapted to match at least a second utterance to said corresponding subset of vocabulary templates to determine which word of said corresponding subset of a plurality of vocabulary words was spoken in said second utterance.

20. The system of claim 16 further comprising s selector adapted to select said vocabulary templates from among a plurality of possible vocabulary templates, wherein said selected vocabulary templates are those which are different, by a predetermined criterion, from said keyword templates.

* * * * *